(No Model.)
J. F. SCHOEPPL.
HOOK AND EYE.
No. 521,391. Patented June 12, 1894.
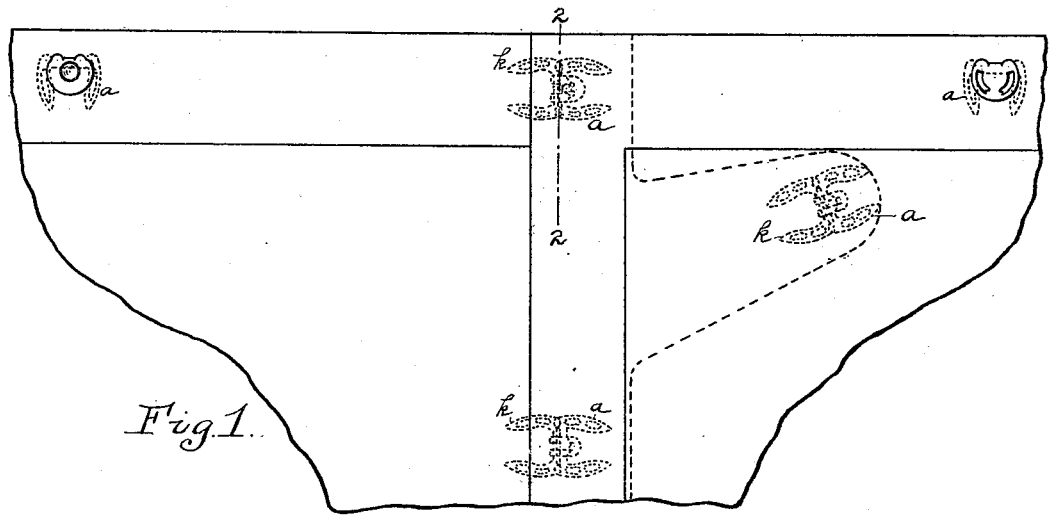
Fig. 1.
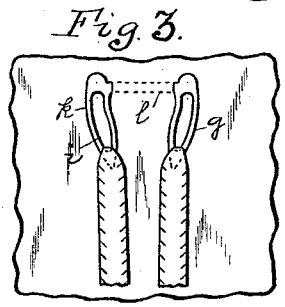
Fig. 3.
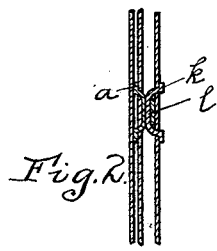
Fig. 2.
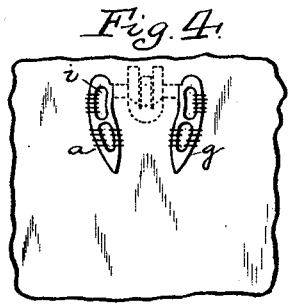
Fig. 4.
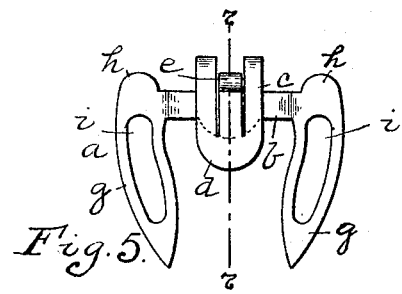
Fig. 5.
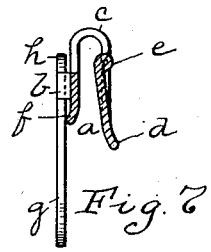
Fig. 7.
Fig. 6.
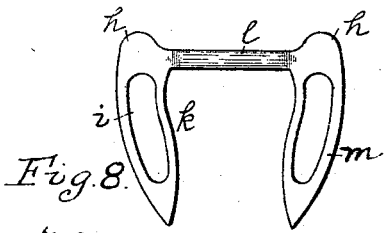
Fig. 8.
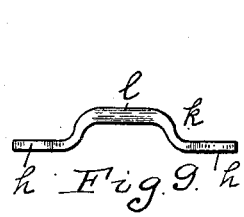
Fig. 9.
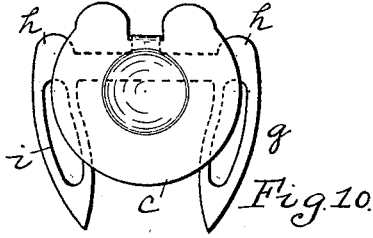
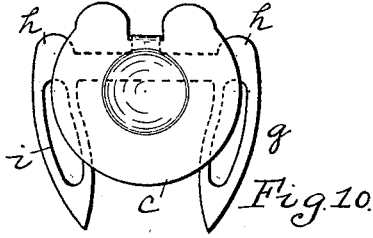
Fig. 10.
Witnesses:
Hry J. Martin.
Luella H. Knox.
Inventor:
Joseph F. Schoeppl.
By Kay, Tatten & Cooke
Attorneys.
THE NATIONAL LITHOGRAPHING COMPANY,
WASHINGTON, D. C.

UNITED STATES PATENT OFFICE.

JOSEPH F. SCHOEPPL, OF PITTSBURG, PENNSYLVANIA.

HOOK AND EYE.

SPECIFICATION forming part of Letters Patent No. 521,391, dated June 12, 1894.

Application filed June 19, 1893. Serial No. 478,161. (No model.)

*To all whom it may concern:*

Be it known that I, JOSEPH F. SCHOEPPL, a resident of Pittsburg, in the county of Allegheny and State of Pennsylvania, have invented a new and useful Improvement in Hooks and Eyes; and I do hereby declare the following to be a full, clear, and exact description thereof.

My invention relates to a hook and eye or like connecting device, its object being to provide such a connecting device which can be readily attached to the garment and held securely in place without the further necessity of stitching if so desired.

My invention comprises, generally stated, a hook and eye or like connecting device, having a body portion and having separate wings projecting from the body portion at an angle thereto, each wing having shoulders extending on the opposite side of the connection to the body portion, so that when said wings have been inserted into the material together with the wings extending beyond the body portion, it is practically impossible to withdraw said hook and eye by a drawing strain brought to bear upon said hook and eye.

My invention further comprises certain other details of construction, all of which will be more fully hereinafter set forth and claimed.

To enable others skilled in the art to make and use my invention I will describe the same more fully, referring to the accompanying drawings in which—

Figure 1 shows two parts of a garment joined by my improved hook and eye, the hook and eye being shown in dotted lines. Fig. 2 is a section on line 2—2, Fig. 1. Fig. 3 shows the manner of securing the eye in place. Fig. 4 is a like view of the hook. Fig. 5 is an enlarged plan view of the hook removed. Fig. 6 is a like view with a portion of the hook proper cut away. Fig. 7 is a sectional view on the line 7—7 Fig. 5. Fig. 8 is an enlarged plan view of the eye. Fig. 9 is a front view of the same. Fig. 10 is a modified form of my invention.

My improved hook and eye may be formed of any suitable metal having the requisite strength.

The hook $a$ may be of any convenient shape and consists of the body portion $b$ on which is formed the hook proper $c$. The hook proper is slit to form the tongue $d$, said tongue being bent to project downwardly and having the end thereof rolled or bent up to form a lug $e$ to hold the eye within the hook when in engagement therewith. As the metal from which the hook $a$ is formed possesses a certain amount of resiliency, the tongue $d$ cut therefrom will possess the same quality, so that when the hook is brought into engagement with the eye said eye will overcome the resistance offered to its engagement with the hook by the tongue $d$, and having passed said tongue, the said tongue will spring back to its normal position. In order to guide the eye into engagement with the hook the body portion $b$ thereof is provided with the downwardly projecting guide $f$. The inclined face of this guide $f$ will always insure the engagement of the eye at once with the hook proper. This tongue $f$ acts also as a bearing face to support the hook and increase its body, so that when the connection is made with the eye the hook will be held more rigidly in place. The body portion $b$ of the hook $a$ is slightly raised at or about the center thereof and slopes down gradually to the sides where project the wings $g$. These wings $g$ are of suitable length and converge toward each other at their inner ends, the outer edges thereof being curved substantially in the form of a horseshoe. The inner ends of said wings $g$ are formed to enable them to readily pierce the material. The outer ends of said wings $g$ extend slightly beyond the body portion $b$ of the hook to form the shoulders $h$ which act when the wings $g$ have been inserted within the material to prevent the withdrawal of said hook. The wings $g$ may be provided with openings $i$ for stitching the hook to the material, or tape may be inserted in said openings and then sewed to the garment to add to the security of the connection.

The eye $k$ consists of the body portion or bar $l$ slightly raised at or about its central portion and sloping down at its ends whence, as in the case of the hook hereinbefore described, project the wings $m$ similar to the wings $g$ of the hook $a$ and acting in the same manner to engage with the material.

In Fig. 10 I have illustrated a modified form of my invention in which the hook proper $c$ is enlarged and is adapted to be used as a button. Its application as a suspender button is shown in Fig. 1, although it may be applicable to other uses.

I have illustrated my invention as applied to men's trousers. In securing the hook $a$ in place the wings $g$ are made to pierce the material at the point where it is desired to locate the hook. The wings $g$ are forced into the material until the shoulders $h$ pass through the material. With the wings in this position the hook is held securely in place and cannot be withdrawn without drawing the material itself over the shoulders. By having the wings converging toward each other at their outer ends substantially in the form of a horseshoe the amount of material between the pointed ends of said wings and pierced by the same will lie evenly between the shoulders $h$ when said wings have been entirely inserted, and will not fold or wrinkle which might occur when said wings were made parallel. If desired the wings $g$ may be stitched to the material, or tape may be passed through the openings $i$ and then sewed to the material. The eye $k$ is secured to the garment in the same manner as the hook $a$.

What I claim as my invention, and desire to secure by Letters Patent, is—

1. A hook and eye connecting device having a body portion and having separate wings connected to the body portion and projecting from such points of connection at an angle thereto, such wings having shoulders extending from the points of connection on the opposite side to the body portion, substantially as and for the purposes set forth.

2. A hook and eye connecting device having a body portion and having separate wings connected to the body portion and projecting from such points of connection, said wings converging toward each other, and said wings having shoulders extending from such points of connection on the opposite side to the body portion, substantially as and for the purposes set forth.

3. In a hook and eye or like connecting device, a body portion having a hook extending from one side thereof and having wings projecting from the ends thereof, and having a tongue projecting from said body portion between said wings on the side opposite to the hook, substantially as set forth.

In testimony whereof I, the said JOSEPH F. SCHOEPPL, have hereunto set my hand.

JOSEPH F. SCHOEPPL.

Witnesses:
ROBT. D. TOTTEN,
J. N. COOKE.